March 28, 1967     J. P. STERRY ET AL     3,311,481
REFRACTORY FIBERS AND METHODS OF MAKING THEM
Filed March 1, 1962
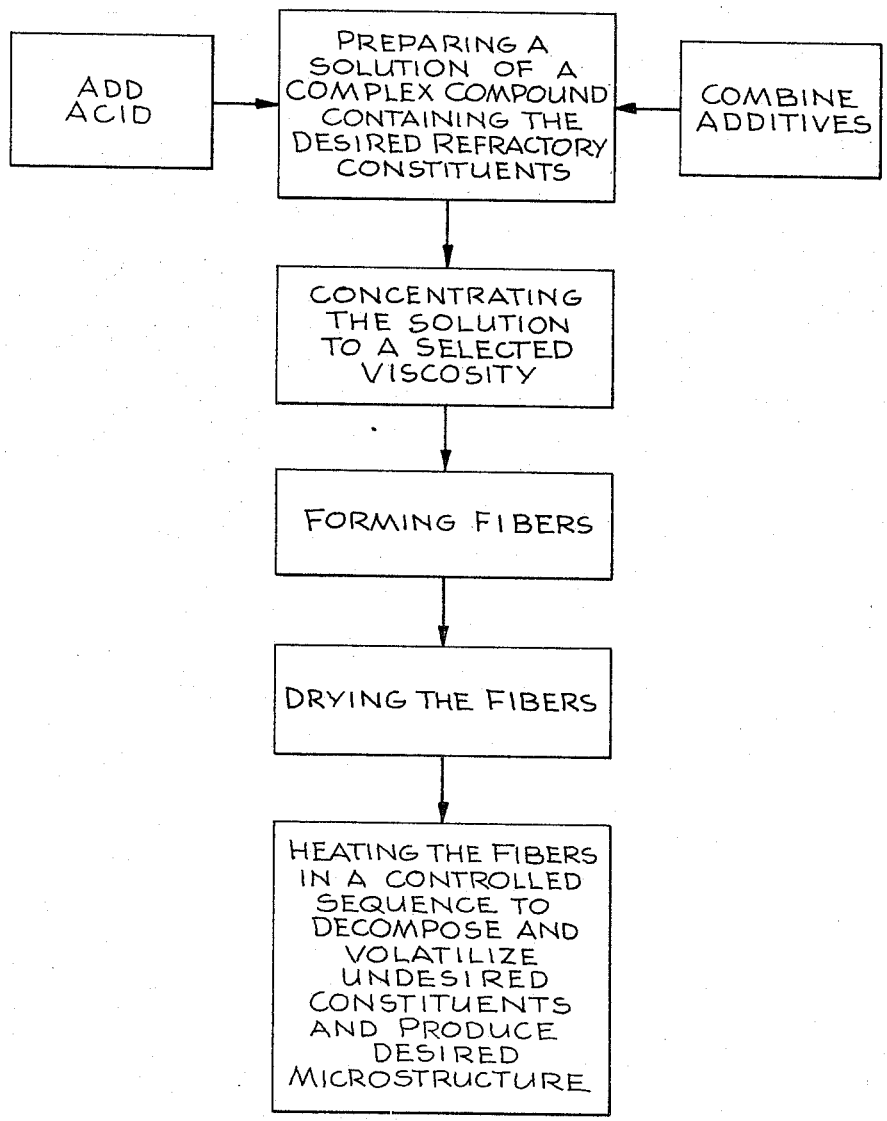
JOHN PATRICK STERRY
ANTON SKURCENSKI
INVENTORS
BY Fraser and Bogucki
ATTORNEYS

United States Patent Office

3,311,481
Patented Mar. 28, 1967

3,311,481
REFRACTORY FIBERS AND METHODS OF MAKING THEM
John Patrick Sterry, Anaheim, Calif., and Anton Skurcenski, deceased, late of Inglewood, Calif., by Baldo M. Kristovich, administrator, Los Angeles, Calif.; said Sterry assignor to Hitco, a corporation of California
Filed Mar. 1, 1962, Ser. No. 179,836
5 Claims. (Cl. 106—57)

This invention relates to refractory fibers, and particularly to fibers having excellent physical and temperature resistant properties and methods of manufacturing such fibers so that they have uniform and controllable characteristics.

Refractory materials are those having structural and thermal characteristics which are particularly suitable for extreme environments. Many modern compositions and bodies are in widespread use for such purposes. Glass fibers, for example, are used as reinforcement in solid bodies because they impart extremely high strength with light weight to such bodies. Glass fiber batts and mats are used for acoustical and thermal insulation because the closely packed extremely fine fibers provide a lightweight but extremely efficient barrier to shock and thermal waves, while being chemically inert and physically strong. Similarly, various forms of asbestos and mineral fibers, which can withstand relatively high temperatures without material damage, are used alone or in combination with other materials for their temperature and fire resistant properties. The term "refractory," as used herein, is not intended to connote primarily only resistance to temperature, but high strength as well, regardless of temperature. While the term "ceramic" is not precisely equivalent, it is also appropriately descriptive and is also used hereafter.

It is now evident, however, that the heretofore superior properties of modern vitreous, ceramic and inorganic bodies are inadequate for many of the extreme conditions imposed by present day high temperature technology. These conditions are encountered in metal refinement and fabrication, nuclear mechanisms and systems, ionized gas mechanisms, and in the operation of high efficiency engines and vehicles using solid and liquid fuels.

It is now increasingly necessary for structures to be capable of withstanding temperatures of the order of several thousand degrees Fahrenheit for long periods, and sometimes many thousands of degrees Fahrenheit for limited periods. Most glass fibers, which have a melting point in the vicinity of 2000° F., are considerably weakened physically at these temperatures, and most other refractory fibers usually do not have comparable amounts of strength. For practical purposes resistance to temperature and erosion must be accompanied by excellent physical characteristics. The greater the strength for weight of a given material, of course, the smaller and lighter in weight bodies using the material may be. Refractory fibers are sought, therefore, which have high tensile strength, freedom from brittleness and tendency to deform, which resist erosion when subjected to high temperature, high velocity gases, and which are not weakened by abrasion, vibration or other static or dynamic effects.

It is known that certain materials can potentially provide the desired physical properties at high temperatures. These materials may be regarded as non-metallic and non-vitreous, being generally oxides of metals and of polycrystalline structure. Prior practices for forming fibers of such materials, however, have encountered a number of difficulties which have sharply limited the use of the fibers. Some methods, such as the vapor deposition process, have provided high strength fibers, but only in short lengths and very small quantities. Other methods provide filaments which are of essentially continuous length, but which have coarse or non-uniform cross-sections and hence relatively poor physical characteristics. The fiber-forming processes of glass technology are largely unsuitable for refractory fibers because of the problems involved in containing and handling materials at the extreme temperatures needed, and because of instabilities in the bath or melt itself.

For full realization of these properties, the materials should be in the form of uniform, small diameter fibers. Because strength is derived primarily at the outer surface of a fiber, tensile strength seems to increase as diameter diminishes and therefore small size is highly preferable. The fibers may be woven into textiles, retained in bulk form, or formed into batts, mats, rovings and the like. Thereafter, the fibers, elements or bodies may be utilized alone or in conjunction with other materials and fillers in the fabrication of a body. As has been shown with glass fiber reinforced structures, intricate and precise shapes may be made by mass production techniques with low cost. For many applications, as in textiles, essentially continuous lengths are needed and in other circumstances the ductility and handling properties of continuous lengths are highly desirable.

The use of the term "fibers" herein is intended to connote elongated filaments of substantially uniform cross-section, which are desirably at least approximately round and of less than of the order of 0.001 inch in diameter. The fibers may or may not be continuous, although their length is at least several orders of magnitude greater than their diameter.

The classes of materials which are suitable for use as refractory fibers include various oxides of metals such as zirconium oxide (zirconia), zirconium silicate (zircon), magnesium oxide (magnesia), thorium oxide (thoria), hafnium oxide (hafnia) and aluminum oxide (alumina), and the oxides of various metals among which are usually classed the rare earths, such as yttrium oxide (yttria). By proper selection of such materials, fibers may be provided which have melting points in excess of 4000° F. and extremely high tensile strength and other physical properties.

An important object of the present invention is therefore the provision of substantially continuous refractory fibers.

Another object of the present invention is the provision of novel processes for the formation of uniform refractory fibers.

A further object of the present invention is to provide processes for fabricating essentially continuous ceramic fibers which have controllable properties and substantially uniform cross-section.

Yet another object of the present invention is to provide fibers having a better combination of physical and temperature characteristics than has heretofore been known.

In accordance with the present invention, there are provided fine diameter, polycrystalline, fine-grained refractory fibers which have uniform circular cross-sections and are essentially continuous. In processes according to the invention, the fibers are formed from a viscous fibering material at relatively low temperature and subsequently converted to fine-grained polycrystalline refractory fibers by a controlled heat treatment.

A feature of processes in accordance with the invention is the employment of several distinct readily controllable phases for the production of refractory fibers. In a first of these phases, a fiberable material is formulated as a solution having a selected viscosity and containing minute particles in which the desired metal oxide solids are present in combined form. In the next phase of the process, extended filaments are obtained from the solution at approximately room temperature by drawing, extruding, spinning or blowing as determined by the fiber diameter and fiber length which are wanted. The physical properties of the fibers are markedly enhanced by inter-particle adhesive forces. Finally, the formed fibers are heat treated at successively higher temperatures in a controlled cycle which successively breaks down and eliminates constituents other than the desired metal oxide and converts these to a selected form, although the fibers neither fuse nor disintegrate.

Another aspect of the present invention resides in the manner of preparation of the viscous fiberable material. An additive may be employed to stabilize the crystal structure of the refractory material through the successive fibering and heating steps. The fibers therefore do not weaken or disintegrate as the various steps are carried out. In accordance with another aspect of the invention the stabilizing effect may be gained through the use of complex additives which are compatible with the fiberable mass.

Another feature of the invention derives from the fact that the concentration of the fiberable material is advantageously carried out under determinable and controlled temperature, acidity and humidity conditions until a preferred viscosity characteristic is obtained. Viscosity control alone is shown to be insufficient to provide long length, fine-grained polycrystalline filaments.

Particularly advantageous results are realized through the practice of the present invention in regards to the preparation of specific complex refractory fibers. Zircon fibers, for example, may be fabricated in accordance with the invention without at any time requiring temperatures which approach the fusion point of either of the primary constituents or of the end product. Fibers may also be formed in which grains or particles of different materials are physically united. A fine-grained polycrystalline constituent may be combined with colloidal particles of another in fibers of this type, as one example.

A further aspect of the present invention relates to the formation of the fibers in desired lengths and with uniform cross-section and fine diameter. A bed of bulk fibers of chosen fineness may be provided by a centrifugal spinning machine using shaped die orifices in a rotating head operating at a predetermined speed under controlled conditions. The fibers may also be formed by drawing, or a combination of drawing and extruding, or by deposition upon a collecting screen.

Further features of the invention relate to the manner in which the complex structures of the formed fibers are broken down into the desired fine-grained refractory constituent alone. In a specific example of the heating cycle the contained water is first driven off as included hydrocarbons are broken down into volatilizable compounds. These compounds are then driven off along with water of hydration, and the fibers are finally burned free of carbon and consolidated without breakdown and without the trapping of impurities in the fibers.

A better understanding of the present invention may be had by reference to the following description, taken in conjunction with the accompanying drawing, in which the sole figure is a representation of principal steps which may be employed in the processes in accordance with the present invention.

Processes for the preparation of uniform, long, and fine diameter refractory oxide fibers proceed from a first phase in which a fiberable material is formed. The material for the fibers is derived, in one specific example, from a solution of a complex carboxylate such as the acetate of the oxide desired. The oxides which may be prepared in this manner include zirconia, zircon, magnesia, hafnia, yttria, and materials having similar properties. With zirconia as the desired end product a water solution of zirconium acetate having 22% $ZrO_2$ solids content may be used. The complex compound may also be a nitrate, suitable for the formation of a solution having the desired concentration of solids. Various concentrated zirconium salt solutions may be employed, including ammonium zirconium lactate solution having 26.5% soluble $ZrO_2$, and trioxodizirconium chloride having 45.4% soluble $ZrO_2$.

In accordance with the invention, it is preferred to employ an additive to stabilize the resultant crystal structure in a desired form when zirconia is to be the end product. Oxides such as calcia, yttria and silica may be used, the calcia being preferred. The amount of additive used has an effect upon the fiber length. Where substantially complete stabilization is obtained, fiber length is essentially dependent only on the forming process. An excess of additive in the fiberable mass, however, also has a detrimental effect on fiberability. It is preferred to introduce the additive in a form compatible with the carboxylate.

A stabilizer may consist, for example, of calcium acetate in a water solution and added in a proportion to provide approximately 5% calcia, or up to 8–10% calcia. At higher temperatures, the Ca oxidizes and combines with the metallic oxide being formed, to give a desired crystal structure. With zirconia fibers as the end product, approximately 8% calcia results in the desired pure cubic structure. Less calcia results in a principally cubic form intermingled with monoclinic and tetragonal forms.

The fiberable mass is also held at a low pH by the addition of an appropriate amount of acid. With acetate solutions about 1% of acetic acid may be added to maintain the pH in the range from 3–5.

Relatively large particles may form in the fiberable mass, and these may be kept to a minimum by frequent or constant agitation and eliminated by passing the solution through a cloth filter.

The initial solution is then concentrated to a degree at which a highly viscous and amorphous mass results. With water as a solvent, evaporation may be carried out with or without a vacuum, but with agitation. Some solutions, which tend to foam under vacuum, must be concentrated without vacuum and consequently at a slower rate. Foaming is particularly encountered where colloidal silica is added, as in the formation of zircon fibers. Care should be also taken during this initial heating to prevent decomposition of the complex compound until fibers have been formed. Extremes of humidity are to be avoided as well during this process. The concentration is carried out until 40 to 50 or more percent solids, based on $ZrO_2$, and a mass having a viscosity of 15,000 to 40,000 centipose at 70° F. are obtained. This material is amorphous and slightly acidic, and constitutes the fiberable mass. The particles of solids in the mass are minute, and may be considered to be principally sub-colloidal and to provide a mixture which approaches a solution in its characteristics.

Concentration may be speeded, with many solutions, by the addition of limited amounts of colloidal material of the desired final refractory (e.g. zirconia).

Fibers may be derived from the fiberable material in a number of different ways dependent upon the fiber length and diameter which are desired and the configuration required for the fiber body. Three precautions should be taken in handling the fiberable mass. First, the solution should be used for fibering without excessive delay, although it may be left for a number of weeks without detrimental effects. Aging appears to permit excess polymerization or hydrolysis which prevents fibering. Second, a chemically inert container should be used. Finally, extremes of temperature and humidity are again to be avoided, because fibers cannot be formed even with correct viscosity under such conditions. This viscous mass may be visualized as being of a syrupy consistency, and when prepared as above described is amenable to fibering by drawing, extruding, spinning, blowing and combinations of these different processes. The viscosity is not so high, however, that the material may not be forced or drawn through dies having diameters varying from 0.010 inch down to 0.001 inch and considerably less.

Extension of the mass into elongated filaments under controlled conditions may be carried out quite rapidly. An important feature of processes in accordance with the present invention is derived from inter-particle physical adherence which greatly assists the fibering. It is not fully understood whether this adherence results from a tendency toward polymerization of the particulate elements or from some other form of bonding between the solid particles. Whatever the nature of the effect, the existence of the adhesive forces in conjunction with the minute solid particles insures maintenance of uniform particle distribution as the viscous mass is physcally deformed. This in turn assists in obtaining more uniform fibers, and in assuring physical integrity through the subsequent processing steps.

A preferred fibering step utilizes a combination of extrusion and blowing to control formation, attenuation and collection of continuous fibers. One or a number of suitably small (e.g. 0.01″) orifices may be coupled to a feed line under which the fiberable material is maintained under pressure. The filamentary lengths are directed downwardly as they are continuously emitted, and are further extended through attenuation by gravity. Final reduction in diameter is achieved by air streams directed across the fibers which blow the continuous lengths onto a collecting screen. The fiber diameters which result are approximately 0.001″ to 0.0001″.

A particularly economical fibering device is a centrifugal spinning machine in which the viscous mass is fed into a rotating head having multiple holes or slots of a selected size. Usually, in this type of spinning machine as well as in the other types of devices, it will be preferred to have a circular die orifice. As the head of the spinning machine rotates at relatively high speed, therefore, essentially continuous fibers are directed through the orifices in the head and solidify immediately upon contact with the atmosphere.

Fibers may also be extruded through a die of selected size from a chamber in which the viscous mass is maintained under a selected pneumatic or hydraulic pressure. This extrusion may also be combined with the drawing technique, by engaging the leading end of an extruded fiber to a rotating drum upon which the fibers, again of continuous character, are collected. The latter expedient permits variation and control of the fiber size by selection of the orifice diameter and the amount of tension applied by the rotating drum. The drum also permits compact collection of the fibers for the subsequent heat treating step.

The viscous mass is also such that the fibers may be formed simply by hand drawing from the surface. In the manual operation, any small member to which the viscous mass will adhere may be inserted into it and then withdrawn at an empirically determined rate to form extended fibers which may be laid on a sheet of chemically inert material, platinum, stainless steel or ceramic, for subsequent heat treating. Fibers formed by any of these steps are principally only $ZrO_2$ in the air-dried solid form of the original compound, plus adsorbed water and water of hydration.

The viscosity and crystallographic stability of the fibered material are not the only considerations involved in providing good refractory fibers. Control of the temperature and humidity are needed to prevent premature decomposition, formation of overly large grain structures and a tendency of the structures to polymerize. The latter effect may also be encountered with a shelf life in excess of six weeks. Nonetheless, the fiberable materials are characterized by their controlled viscosity. A zirconium diacetate solution, for example, will appear after concentration as a light brownish amorphous material, preferably having a viscosity of from 15,000 to 40,000 centipoise at 70° F. This material, which may also be represented as $H_2ZrO_2(CH_3COO)_2 \cdot XH_2O$ or diacetatozirconic acid, has a pH of 4.0 to 4.5. Silicate and nitrate solutions may be concentrated to like effect, as may complex salt solutions of the desired solids.

The length of the fibers which are formed appears to depend on the initial complex compound, the nature and amount of the additive, if one is used to stabilize the crystal structure, and the fibering step which is employed. When working from an acetate solution for example, the fibers which are ultimately derived may be relatively short. The length of zirconia fibers may be increased markedly by the use of a proper amount of additive, although length is again reduced if the addition is excessive. A silicate solution, on the other hand, provides a fluffy mass similar to bulk glass fibers, in which the fibers are essentially continuous. Subsequent handling and heat treatment have the effect, which is usually not appreciable, of breaking the fibers and shortening the fiber lengths.

The stabilizers are added in a form compatible with the solution (e.g., calcium oxide is added to zirconium diacetate in the form of calcium acetate). Oxides of yttrium, ytterbium, cerium and lanthanum are examples of the class of materials which may be used as additives to stabilize zirconia. In some instances the stabilizer will not be effective in certain forms because it may not have sufficient solubility to be retained during concentration. Such difficulties may be overcome by using a different form such as lanthanum oxide in the form of colloidal particles.

The choice of technique for forming the fibers may, of course, be dictated by the subsequent use of the fibrous mass. For most applications, the essentially continuous lengths and high volumes obtained with the use of a combination of extruding and blowing are economically desirable. A centrifugal spinning machine is advantageously employed where a bulk or batt form is to be derived, and drawing, extruding or combination drawing-extruding machines are preferably employed where uniformly disposed fibers are to be used for textiles or roving. For zirconia fibers and a centrifugal spinning machine, orifices ranging from 0.010 to 0.030 inch in their smallest dimension have been used, together with rotational speed of 3450 r.p.m., although the speed may be varied over a wide range. Optimum fiber charcteristics have been achieved when the ambient relative humidity is maintained between 30 and 50 percent and the ambient temperature is maintained between 60° and 85° F. during the fibering.

With the combination drawing-extruding process, and zirconia fibers, the fiberable mass has been placed in an extrusion tube having an orifice 0.003 to 0.005 inch in diameter at one end. A source of air pressure attached to the other end of the tube and sealed hermetically therewith is then caused to act on the viscous mass within the tube. An air pressure of about 10 to 1000 p.s.i., depending upon orifice size and the viscosity of the mass, is maintained within the tube so that fibers are extruded out of the orifice onto a revolving drum which collects the fibers until completely covered. This drum may be removed and used as a form for handling the fibers during the subsequent heat treat cycle. By revolving the drum at a slightly higher rate of speed than the rate at which the fibers are extruded from the orifice, the fiber diameter is considerably diminished, and fibers have been made with a circular cross-section of from 0.005 to 0.0003 and less inch in diameter.

To maintain the physical integrity of the fibers while reducing them to the desired refractory material alone, they are heated in successively higher steps in a plateau-type cycle. The temperatures employed may range from a lowest temperature, in which only drying takes place, to a final temperature which approaches the melting point of the refractory. Fine-grained polycrystalline refractory fibers are formed without carbon becoming trapped in the fibers and without physical disintegration of the fibers.

In the heat treating cycle, each successive step provides a separate function in the sequential transformation of the fibered material into the consolidated oxide. The first step may be merely a drying step carried out at a controlled relatively low level. The next heating step may then start the controlled decomposition reaction. With zirconium diacetate, for example, heat is used to decompose the diacetate and to eliminate some acetic acid and water, thus:

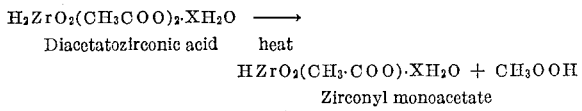

The volatilized constituent and excess water may be driven off in a single heating cycle. At the next step, however, the monoacetate is fully broken down and the carbonaceous compounds are oxidized as the remaining water is driven off. From zirconyl monoacetate the reaction is as follows:

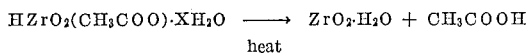

The fibers may then be raised in temperature to a still higher level at which all contained water is driven off and all adhering carbons are oxidized. This follows the reaction:

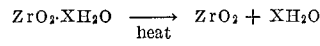

The heat treat cycle may be concluded at this point or by firing at a still higher temperature to consolidate and heat shrink the fibers. This may also serve to arrest and control grain size. Whether or not the final firing is used the temperatures which are reached are far below the levels needed in prior art techniques.

Refractory fibers formed in accordance with the invention have extremely high tensile strength, high melting point, high elastic modulus, low thermal conductivity, high thermal stability and excellent circular cross-sections. They may therefore be used for insulation, as in the form of blankets about jet and rocket engines, and as heat shields. Their extremely high melting points, ranging from 3500° to 5000° F. enable them to far surpass the insulative and protective properties of most presently available fibers which are used for these purposes. Fibers constructed by processes in accordance with the invention and having relatively coarse diameters (0.01″) still have tensile strengths in excess of 85,000 p.s.i. Fibers of 0.0001 to 0.0005″ in diameter accordingly have tensile strengths in excess of 200,000 p.s.i. They are also found to have a Young's modulus of $25 \times 10^6$ p.s.i. and higher.

The combination of high strength and high melting point makes such refractory fibers particularly suitable for ablative materials, as in nose cones, rocket nozzle liners and other parts which are directly exposed to high temperature and high velocity gases. When used in this manner, the refractory fiber surfaces which are exposed to heating effects maintain their structural integrity even though exposed parts of the fibers vaporize and flow from the surface. Additional thermal insulative effects are provided by the high heat of vaporization of the fibers, and the highly viscous charcteristics of the fibers during melting.

Spectrographic analyses and X-ray diffraction tests confirm the chemical compositon and crystallographic nature given above for these refractory fibers. Optical micrographs, in addition verify the fiber diameters as being of the order of 0.001″ to 0.0001″. Furthermore, the structure of the fibers is observed to be fine-grained, with grain size distribution varying in a continuum from 300 to 3000 angstroms, with a moderate intermediate peak at a value dependent upon the composition and final heat treating temperature as evidenced by electron micrographs. The fibers produced by processes in accordance with the invention include zirconia, zirconia with small amounts of stabilizer, zirconia with varying amounts of other oxides, zircon with a mixture of silica and zirconia, hafnia, yttria and titania.

Specific examples of processes in accordance with the invention are as follows:

*Example I*

Zirconia refractory fibers were derived from a zirconium acetate solution. The zirconium acetate, initially having 22% $ZrO_2$ solids in the diacetate form in water solution, was evaporated to produce a 40 to 50% $ZrO_2$ solids content solution. To 500 lbs. of the 22% $ZrO_2$ zirconium acetate solution was added approximately 6% based on CaO (18.6 lbs.) of calcium acetate as a stabilizer and about 1% (1 lb.) of acetic acid. The pH was set thereby at about 3.5 to 4.0. The evaporation was carried out at a temperature of 140° F. and not exceeding 150° F. with agitation to avoid formation of a crust and under a vacuum of 28″ Hg. The temperature was held below 150° F. by using a tank with a heating jacket and circulating water through the jacket. A viscosity of 25,000 to 30,000 centipoise at 70° F. was obtained in the resultant 40 to 50% $ZrO_2$ solids solution. The fibers were then formed by feeding the viscous mass to a centrifugal spinning machine with a 5¼″ diameter head having multiple holes of .020″ in their smallest dimension. A rotational speed of 3450 r.p.m. was employed. The ambient relative humidity was maintained between 30 and 50 percent and the ambient temperature between 60° and 85° F. The fibers thus formed are particularly suited for felted products.

Essentially continuous fibers are provided by the combination extruding-blowing process. By feeding the fiberable mass under pressure through a header in which are coupled a number of needle orifices of about 0.01″ diameter, a number of fine downwardly directed filamentary streams are established. These filaments are somewhat attenuated during flow. An air current directed transversely across the extending filaments forces the filaments into a curved path and carried them horizontally onto a collecting screen. In doing so the filaments are further attenuated, to diameters of the order of 0.001″. The mass formed on the collecting screen accumulates rapidly, and the fibers are essentially continuous.

Fibers formed by either step were spread on a stainless steel tray to a depth of approximately 2″ and subjected to a heat treat cycle as follows:

(1) 140° F., 2 hrs.
(2) 340° F., 2 hrs.
(3) 1100° F., 4 hrs.
(4) 2000° F., 2 hrs.

Alternatively, the viscosity may be varied in the range of from 15,000 to 40,000 centipoise at 70° F. Different viscosities are used in relation to the size of the orifice which is used in forming the fibers.

As another alternative, fibers prepared in the same manner may be subjected to a different heating cycle, in which heating at 140° F. is not employed. Instead, the first heating step may consist of heating at 340° F. for between 2 and 4 hours. Thereafter the fibers may be heated at 1100° F. for approximately 4 hours, and then between 1800° to 2000° F. until all carbonaceous material is burned off, usually about two hours. This may be followed by a final heating step, at 2000° to 4000° F. for two hours, for control of crystal size and grain size, and for a preliminary shrinkage of the fibers for subsequent use in high temperature environments.

In each of these procedures, breakage of the fibers may occur to some extent during the firing steps. The fibers may be reduced in length to less than ¼″ but because even at this size their length is several orders of magnitude greater than their diameter, they are still properly called fibers. The cross-sectional configuration remains uniform, and the strength properties are retained. These zirconia fibers have an approximate composition of 94% $ZrO_2$ and 6% stabilizer, and a bulk density of about 21 #/ft.$^3$. The cross-section of the fibers formed in this manner varies in diameter from approximately 0.1" to 0.0008", and with this diameter tensile strength is between 85,000 p.s.i. and 100,000 p.s.i. Fibers produced by the same process but of smaller diameter have a tensile strength of 200,000 p.s.i. or higher. They have a Young's modulus value of at least $30 \times 10^6$ p.s.i.

Example II

Refractory fibers which are a combination of approximately 80% zirconia and approximately 20% silica are provided by utilizing a molar ratio of two to one of zirconia to silica. The fiberable material for this product may be formed by using constituents in the ratio of 1600 milliliters zirconium diacetate to 286 milliliters "Syton 200" (a colloidal silica product of the Monsanto Chemical Company containing 30% $SiO_2$) to 18.86 milliliters of acetic acid. Maintenance of a pH of 3.0 to 5.0 is important with the addition of colloidal silica, inasmuch as precipitation would otherwise be likely to occur.

The fiberable mass is formed of these constituents in the manner previously described, and then fibered and fired in accordance with the sequence given in Example I. Although silica is present, it is present in such relatively low proportion that the fibers are properly regarded as principally zirconia fibers with an additive. The combination of materials, however, results in a longer fiber having a woolly form. The bulk density of fibrous bodies provided in this manner is approximately 6 #/ft.$^3$. Cross-sectional dimensions are approximately the same as those given above in Example I. The fibers are more readily handled prior to and subsequent to firing, however, and maintain a considerably longer length.

Principally zirconia fibers having approximately 90% zirconia and approximately 10% silica may be provided from a complex compound having a molar ratio of 4 $ZrO_2$ to 1 $SiO_2$. For this type of fiber, the fiberable mass may be formed from constituents in the approximate proportion of 1600 ml. zirconium diacetate to 143 ml. "Syton 200" to17.4 ml. acetic acid. The mass may then be concentrated, fibered and fired in accordance with the examples previously given.

Example III

Zircon fibers, having a molar ratio in the initial complex compound of one to one between $ZrO_2$ and $SiO_2$ and the chartceristic cubic crystal structure may be provided from a solution having constiuents in the proportion of 1200 ml. zirconium diacetate to 429 ml. "Syton 200" to 16.2 ml. acetic acid. The approximately 1% of acetic acid which is added maintains the pH in the range of 3.5 to 4.0. The presence of the "Syton 200" in these compositions materially increases the time required for evaporation or concentration, inasmuch as a hard vacuum cannot be used. Apparently, the presence of the colloidal silica reduces the surface tension of the fiberable mass, and the use of the vacuum then results in foaming.

Zircon fibers provided by subsequent fibering and firing in accordance with the above examples have a composition which is 99% and more $ZrO_2 \cdot SiO_2$. Alternatively, it has been found that the heating cycle for zircon fibers alone may be simplified by bring the temperature up gradually to 1100° F., starting with a cold furnace. These fibers are of highest quality, being essentially continuous, and forming a fluffy and resilient mass. The fiber cross-section is circular, and the diameter when formed by the centrifugal spinning machine, varies from .01" to .0008". The tensile strength of these zircon fibers is in excess of 100,000 p.s.i.

Example IV

Zirconia fibers may also be formed from ammonium zirconium lactate received as a 26.5% $ZrO_2$ solids solution. Such a solution may be concentrated for good fibering to about 15,000 centipoise, without the use of stabilizers. Refractory fibers may then be formed by using a centrifugal spinning machine having 0.020" diameter orifices, and firing in the cycle given above in Example I.

Example V

Trioxodizirconium chloride received as 45.4% $ZrO_2$ solids solution has also been used in forming a fiberable mass for zirconia fibers. A viscosity of approximately 30,000 centipoise, attained by evaporation, has been found suitable, without stabilizer being added. Thereafter fibers were formed by a centrifugal spinning machine having 0.020" orifices, and the undesired constituents eliminated by use of the firing cycle of Example I.

While there have been described above various processes in accordance with the invention for fabricating fine-grained polycrystalline refractory fibers of continuous or long lengths and uniform small cross section, by the use of successive steps involving the formation of a fiberable mass, fibering and elimination of non-refractory constituents from the fibers, it will be appreciated that the invention is not limited thereto. Accordingly, the invention should be considered to include all alternative processes and steps falling within the scope of the appended claims.

What is claimed is:
1. The process of preparing ceramic fibers having at least substantial proportions of zircon which includes the steps of adding colloidal silica to zirconium diacetate in a proportion establishing a 1:1 molar ratio between the zirconia and silica constituents, adding acetic acid to maintain the pH in the range of approximately 3.5 to 4.0, evaporating the amorphous mass thus provided to a viscosity of between 15,000 and 40,000 centipoise at 70° F., forming amorphous fibers from the mass, and firing the fibers at successively higher temperatures to above the crystal-forming temperature of the fibers but below the fusion temperature of zirconia, silica and zircon to decompose and eliminate other constituents and to form polycrystalline fibers.

2. A process for preparing metal oxide fibers having selected proportions of zirconia and silica which includes the steps of preparing a solution containing a complex carboxylate having a selected molar ratio of zirconia to silica of at least about 1:1, concentrating the solution to a selected viscosity between 15,000 and 40,000 centipoise at 70° F. and maintaining the pH at 3.0–5.0, forming amorphous fibers having approximately 0.001 inch diameters from the solution, firing the formed fibers at a first temperature to eliminate excess water and to decompose the carboxylate, and firing at a second higher temperature to oxidize the remaining constituents other than the desired metal oxide, whereby polycrystalline fibers are formed.

3. A process for preparing small diameter, round fibers having at least substantial proportions of zircon, including the steps of preparing an amorphous viscous mass containing principally subcolloidal particles including zirconia in combined form by preparing a zirconium carboxylate solution, adding colloidal silica in a molar ratio equivalent to said zirconia and concentrating the same to a viscosity of 15,000-40,000 centipoises (at 70° F.) while maintaining the pH at 3.0–5.0, extending the material of the mass into elongated amorphous filaments, and heating the filaments by heating to successively higher temperature levels below the fusion points of zirconia and silica to provide polycrystalline filaments.

4. Fine-grained, circular cross-section, polycrystalline zircon fibers.

5. Crystalline refractory fiber bodies comprising round fibers of the order of 0.001 inch in diameter, the fibers containing substantial proportions of zircon crystals.

References Cited by the Examiner

UNITED STATES PATENTS

| | | |
|---|---|---|
| 2,886,404 | 5/1959 | Teja. |
| 2,908,545 | 10/1959 | Teja. |
| 2,919,996 | 1/1960 | Teja. |
| 2,969,272 | 1/1961 | Teja. |
| 3,082,051 | 3/1963 | Wainer et al. _____ 106—39 |
| 3,082,099 | 3/1963 | Beasley et al. _____ 106—39 |
| 3,096,144 | 7/1963 | Wainer et al. |
| 3,110,681 | 11/1963 | Meadows et al. _____ 252—313 |
| 3,159,583 | 12/1964 | Fitch et al. _____ 252—313 |
| 3,180,741 | 4/1965 | Wainer et al. _____ 106—39 |

HELEN M. McCARTHY, *Acting Primary Examiner.*

MORRIS LIEBMAN, TOBIAS E. LEVOW, *Examiners.*

C. B. HAMBURG, *Assistant Examiner.*

UNITED STATES PATENT OFFICE
CERTIFICATE OF CORRECTION

Patent No. 3,311,481                                March 28, 1967

John Patrick Sterry et al.

It is hereby certified that error appears in the above numbered patent requiring correction and that the said Letters Patent should read as corrected below.

Column 3, line 10, for "oxide" read -- oxides --; column 4, line 51, for "centipose" read -- centipoise --; column 9, line 8, for "0.1" read -- .01 --; line 46, for "to17.4" read -- to 17.4 --; line 53, for "chartceristic" read -- characteristic --; line 54, for "constiuents" read -- constituents --; line 68, for "bring" read -- bringing --.

Signed and sealed this 25th day of June 1968.

(SEAL)
Attest:

Edward M. Fletcher, Jr.                           EDWARD J. BRENNER
Attesting Officer                                Commissioner of Patents